Jan. 19, 1960  J. H. MOLAT  2,921,470
HIGH AND LOW LIQUID LEVEL GAUGE
Filed March 1, 1956  3 Sheets-Sheet 1
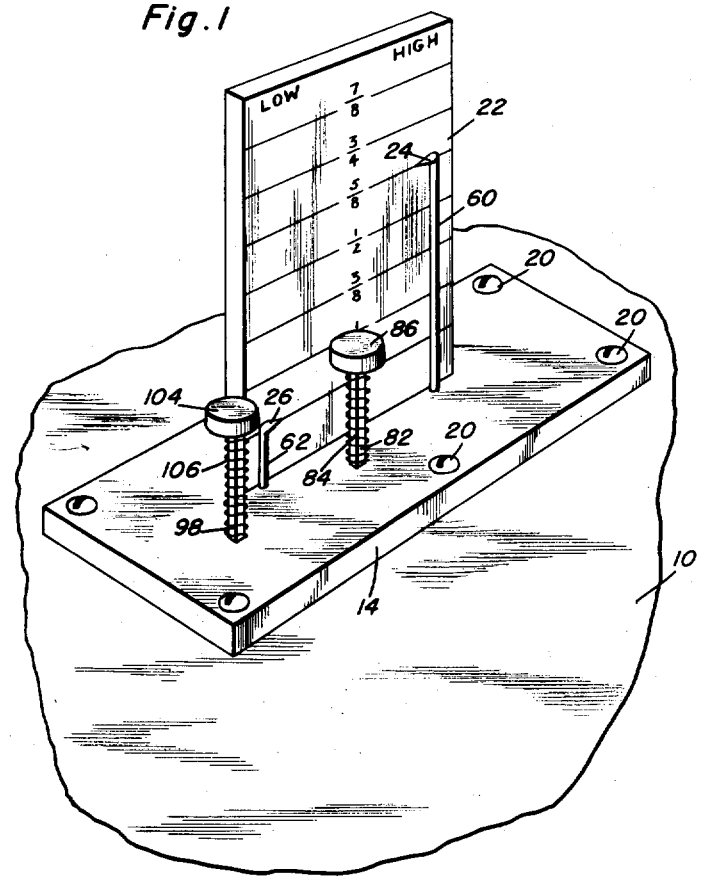
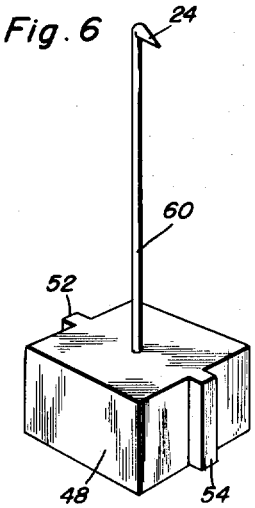
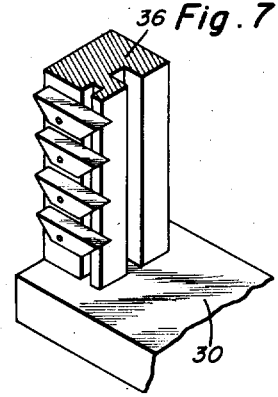
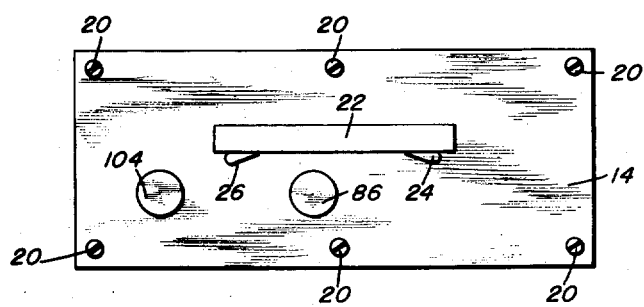
Joseph H. Molat
INVENTOR.

Jan. 19, 1960 J. H. MOLAT 2,921,470
HIGH AND LOW LIQUID LEVEL GAUGE
Filed March 1, 1956 3 Sheets-Sheet 2

Joseph H. Molat
INVENTOR.

BY

Jan. 19, 1960  J. H. MOLAT  2,921,470
HIGH AND LOW LIQUID LEVEL GAUGE
Filed March 1, 1956  3 Sheets-Sheet 3

Joseph H. Molat
INVENTOR.

BY
Attorneys

United States Patent Office 2,921,470
Patented Jan. 19, 1960

2,921,470
HIGH AND LOW LIQUID LEVEL GAUGE

Joseph H. Molat, Brooklyn, N.Y.

Application March 1, 1956, Serial No. 568,764

3 Claims. (Cl. 73—311)

This invention relates to gauges and particularly to a gauge for indicating respectively high and low levels in a single supply, such as a tank of liquid.

The primary object of the invention is to provide a gauge from which to obtain a record of the number of gallons of liquid delivered into a tank such that at a time subsequent to the delivery the exact number of gallons delivered may be ascertained by a direct reading.

A further object of the invention is to provide a high and low level liquid gauge that is adapted to be connected to or in some other way operatively associated with a fuel oil tank in order to keep a record of high and low levels whereby the gallonage delivered into the tank may be ascertained at a time subsequent to the actual delivery, the high and low level liquid gauge being constructed simply and with a purely mechanical arrangement of parts so that the usual protections against electrical charges that are connected with volatile liquid tanks are not required but yet, the accuracy of the gauge is within practical requirements.

Another object of the invention is to provide a practical device for indicating the various levels before and after delivery of a supply of fuel oil or other liquid, the gauge being so arranged that the current supply of liquid on hand in the tank is readable directly thereon.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary perspective view of a tank on which a gauge which exemplifies the principles of the invention has been applied;

Figure 2 is a top plan view of the gauge in Figure 1;

Figure 6 is a perspective view of a float and pointer which constitutes a part of the gauge of Figure 3;

Figure 7 is a fragmentary perspective view of a portion of one of the rails and a number of pawls that engage the float of Figure 6;

Figure 3:
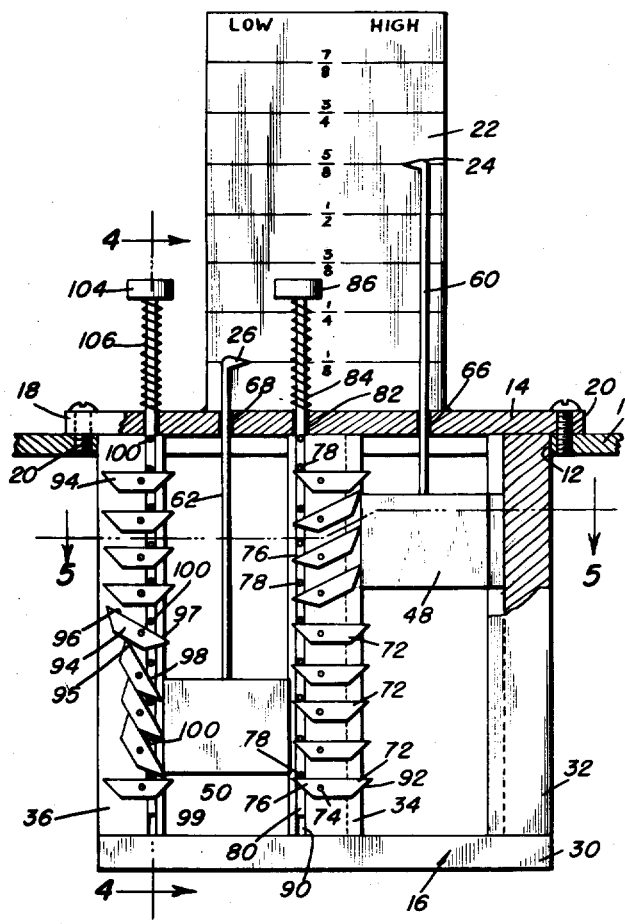
Figure 3 is a longitudinal sectional view of the gauge in Figure 1.
Figure 4:
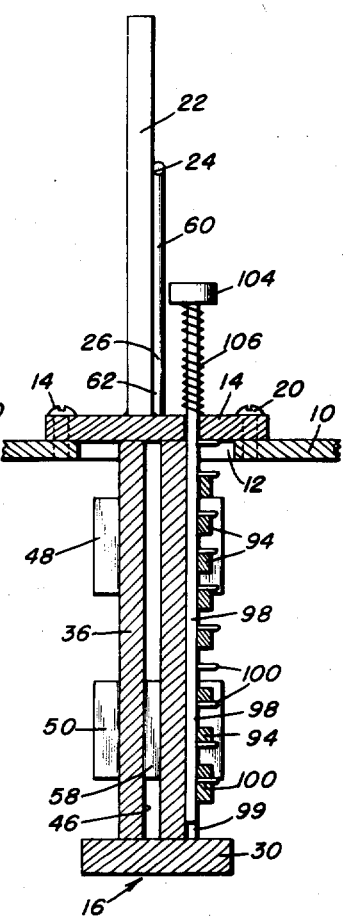
Figure 4 is a sectional view taken on the line 4—4 of Figure 3 and showing the gauge construction.
Figure 5:
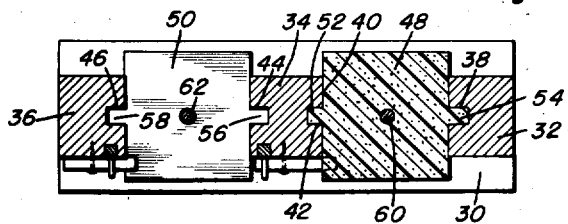
Figure 5 is a sectional view taken on the line 5—5 of Figure 3.
Figure 8:
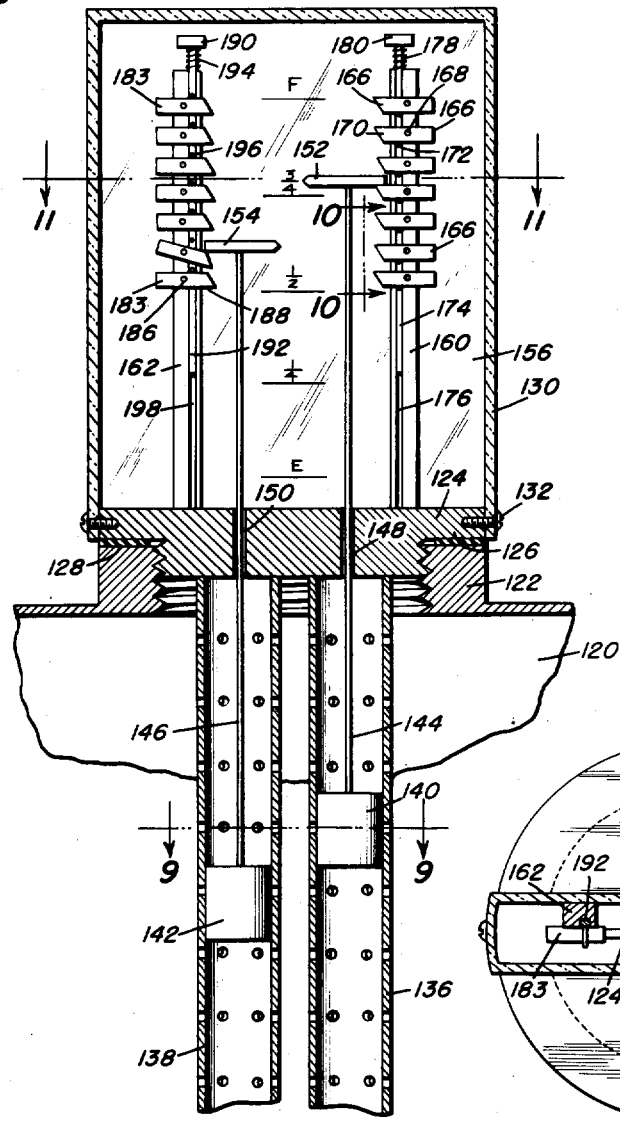
Figure 8 is a longitudinal sectional view of a modified form of the invention.
Figure 10:
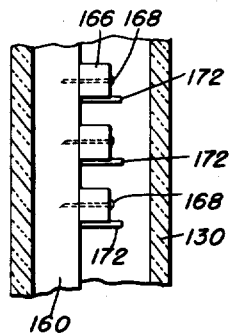
Figure 10 is an enlarged fragmentary sectional view taken on the line 10—10 of Figure 8 and showing particularly the locking pawls for the indicators of Figure 8; and, Figure 11 is a transverse sectional view taken on the line 11—11 of Figure 8.
Figure 11:
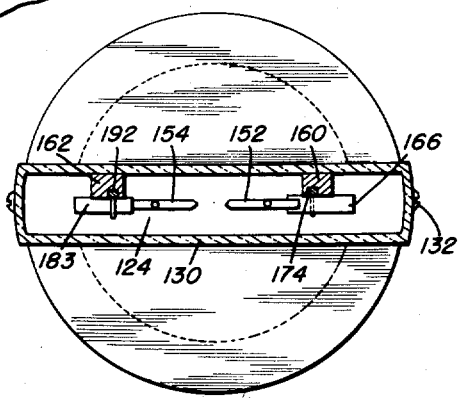
Figure 9:
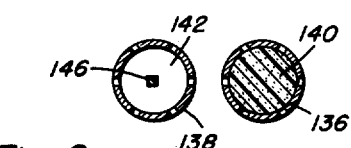
Figure 9 is a transverse view shown in section and taken on the line 9—9 of Figure 8.

Attention is first invited to Figures 1-7, inclusive, wherein there is a typical tank 10 functioning as the means of storing a supply of liquid, for example, an oil tank having fuel oil therein as would be found in many domestic or commercial installations. In the embodiment shown in Figures 1–7 an opening 12 is formed in one wall of tank 10 and a cover plate 14 is placed in the opening. This cover plate may be a part of a casting whose open frame 16 fits in the tank or may be a separate part that is secured to the frame 16. Plate 14 has a flange 18 that overlies a part of the tank 10 and into which bolts 20 are fastened. These bolts are threaded in tapped apertures in the tank 10 thereby holding the plate 14 in covering relationship to the opening 14 with the frame 16 in the tank. If found desirable or necessary, a gasket or other sealing device may be used between the plate 14 and the tank 10. Panel 22 is fixed to the top of plate 14 and it has "high" and "low" markings thereon. The markings may be in the form of fractional or decimal parts of the total tank volume or may be in actual gallons. The indicia on panel 22 is to be read with pointers 24 and 26 and are operable thereadjacent.

Frame 16 comprises a lower plate 30 that is approximately parallel to plate 14 together with three rails 32, 34 and 36, respectively. The rails are parallel to each other, rails 32 and 36 being at the ends of plate 30 while rail 34 is between the two rails 32 and 36. Each of the rails is welded or otherwise rigidly fixed to plate 14 and also to plate 16 holding the entire frame 16 as a unified structure. Rail 32 has a longitudinal guideway extending from the top to the bottom thereof and on the surface of the rail which confronts the surface 40 of rail 34. The latter surface has a guideway 42 in it. The opposite side of the intermediate rail 34 has a guideway 44 in confronting relationship to the guideway 46 in the end rail 36. This forms two pairs of ways in which the floats 48 and 50, respectively, are adapted to slide. Float 48 consists of a buoyant body that has parallel longitudinal ribs 52 and 54 on opposite sides of it, the latter being captive in the guideways 38 and 42, respectively. Float 50 is of similar construction, having ribs 56 and 58 that are slidable in the guideways 44 and 46. Pointers 24 and 26 are formed at the outer ends of rods 60 and 62, the rod 60 being anchored in float 48 while the rod 62 is anchored in float 50. These rods protrude upwardly through apertures 66 and 68 formed in plate 14. Accordingly, the floats 48 and 50 are located in tank 10, but the rods 60 and 62 passing through apertures 66 and 68 having their pointers 24 and 26 located on the exterior of the tank where they are readily visible for reading in connection with the indicia on panel 22. Due to the configuration of the floats they do not rotate with respect to the rails but are capable of sliding in the guideways thereof.

Means are operatively connected with each of the floats for releasably holding the floats in selected positions. For the float 48 there is a group of pawls 72. The pawls are arranged in a series with each being independently pivoted by a pin 74 to one face of the intermediate rail 34. Pivot 74 is located closer to one end 76 of pawl 72 than the other so that the pawl 72 has a tendency to pivot in one direction. This pivotal movement is restricted by means of a stop 78 that is fixed to release rod 80. There is a similar stop for each of the pawls, all of the stops being secured to release rod 80. The upper end of rod 80 protrudes through an aperture 82 in plate 14 and has a spring 84 or equivalent biasing device mounted thereon and reacting on the push-button 86 on the extremity of rod 80 and also on a surface of plate 14. The spring presses the rod in one direction and functions as a return device for the rod after it is manually slid in its guideway 90 that is formed longitudinally of and in the intermediate rail 34. One end 92 of each pawl 72 is formed as a chisel or otherwise arranged to exert a holding force on the float 48. This is done (Fig. 3) by frictional engagement with one side of the float.

Float 50 has means for releasably locking it in a selected position. These means are very similar to the series of pawls 72. They consist of an additional series of pawls 94, each of which is identical in construction. The typical pawl has a pivot pin 95 between the ends 96 and 97 thereof. Release rod 98 is slidable in its guideway 99 that is formed in rail 36. A series of stops 100 are carried by the release rod 98, these rods being spaced from each other and there being one provided for each pawl 94. The ends 97 of the pawls 94 are arranged to frictionally engage a side of float 50 to prevent it from moving in one direction. Upon actuation of the button 104 of release rod 98 against the yielding opposition of spring 106, the pawls 94 are pivoted about their pivot pins 95 by stop 100 bearing on each.

The operation of this form of the invention is as follows: It is assumed that there is a low liquid condition existing in tank 10. If the low float 50 is not already at the low level of liquid in the tank, the button 104 is depressed and released thereby oscillating the release rod 98. This movement causes the stops 100 to bear against the top surfaces of the pawls 94 and separate any of them which may be in engagement with the float 50 from the float. Accordingly, the float is able to fall by gravity to the level of the liquid in the tank. Liquid is then introduced into the tank 10 thereby bringing up the level thereof. This level rising tends to carry float 50 with it, but the float cannot move inasmuch as the ends 97 of the pawls prevent the upward movement thereof by frictionally engaging a side surface thereof. Therefore, pointer 26 registers with the indicia 22 a condition that indicates the level of liquid in the tank prior to the introduction of the additional liquid. However, the float 48 is capable of being lifted by the liquid as the liquid rises. This is so inasmuch as the pawls are pivoted closer to the end 76 of each than the locking end 92. In addition, the stops 78 are in contact with the upper surface of the pawls 72 permitting them to rotate in such direction that the upper surface of the pawls under stops 78 are merely separated from the stops. Float 48 will continue to be elevated together with the high liquid level in the tank. When the liquid in the tank 10 is drawn therefrom, float 48 cannot return inasmuch as the ends 92 of the pawls 72 engage a side surface of float 48. Therefore, the pointer 24 on rod 60 permanently indicates the high level condition of the tank. In effect, the floats 48 and 50 are capable of substantially unrestrained motion in opposite directions, that is, with respect to Figure 3 the float 48 is capable of unrestrained motion in the up direction, while float 50, as shown in Figure 3, is capable of unrestrained motion in the down direction. However, the motions of the floats 48 and 50 as described above are prevented in the direction opposite to the unrestrained directions. In other words, the float 50 cannot move downwardly while the float 48 cannot move upwardly in the absence of manual release of the dogs therefrom by actuation of the release rods 80 and 98, respectively. The result is that when a customer purchases a quantity of liquid, for example fuel oil, the owner may, by simple observation have a quick check as to the accuracy of the delivery and at a time subsequent to the delivery. For the home owner, he need not be at home while the oil is being delivered and yet, he may observe quickly the accurate quantity of oil that has been delivered to his tank. After observing this the owner may, if he desires, actuate the release rod 98 thereby freeing the float 50 so that it quickly moves to the level of the liquid in the tank. In this way, pointer 26 is usable as a gauge to indicate current liquid in the tank during the use of the equipment which draws the liquid therefrom. This is so in that the downward motion of float 50 is not restrained.

The embodiment of the invention in Figures 8–11 is similar in function to the previously described embodiment. There are some differences in structure. Accordingly, in Figure 8 there is a fragmentary part of a tank 120 that is fitted with a threaded collar 122 in which plug 124 is secured. The plug has a flange 126 which seats on a gasket 128 between flange 124 and collar 122. A transparent end closure 130 is removably attached to the flange 126 by a suitable expedient, for example by means of screws 132, clips or by merely frictionally fitting thereover.

Two perforated tubes 136 and 138, respectively, are attached to the bottom surface of plug 124 and form guides for the floats 140 and 142 which are slidable respectively therein. These floats are exposed to the pressure and hence tend to remain on the upper level of the liquid in tank 120. Rods 144 and 146, respectively, are attached to floats 140 and 142, these rods being non-circular in cross-section (Fig. 9) and pass through similarly cross-sectioned apertures 148 and 150 that are formed in the plug 124. In view of this, the rods 144 and 146 will not rotate but are capable of sliding movement with the floats 140 and 142 in their tubes 136 and 138.

The upper ends of rods 144 and 146 are provided with indicators 152 and 154 which are readable on and with respect to the vertically rising panel 156 that is attached to plug 124 and located within the enclosure 130.

Rails 160 and 162 are anchored at the lower ends to the plug 124 and are approximately parallel to each other. These are also encased within the enclosure 130 as are the other structural elements connected therewith. A series of pawls is on the rail 160. The series consists of a number of pawls such as pawl 166 mounted by means of a pivot pin 168 between its inner end 170 and its outer end. The ends 170 of the pawls have means, as beveled ends, to allow the indicator 152 to slide easily thereover when the indicator is being lifted. Stop 172 for the pawl 166 and an identical stop for each of the pawls, prevents the pawls from being gravity lowered at one side thereof. They also prevent the pawls from being positively lowered as by the application of a force from the indicator 152. The stops are attached to a release rod 174, the latter being slidable in a guideway 176 which is formed longitudinally within the rail 160. A return spring 178 is mounted on one end of the release rod 174, reacting on rail 160 and also on the push-button 180. Upon application of a downward force on the push-button 180, the release rod 174 is moved downwardly thereby permitting the pawls 166 to be pivoted in such direction as to release indicator 152 and allow it to be gravity-lowered. Accordingly, the indicator and hence the float 140 may be moved upwardly without substantial restrain but cannot be moved downwardly in the absence of a positive releasing of the release rod 174.

The indicator 154 has means operatively connected with it for preventing movement in one direction and allowing motion in the opposite direction. These means consist of a series of pawls 183 that are mounted for pivotal movement, as by having pins 186 passed through them and connected to rail 162. The ends 188 of the pawls are fashioned to permit the indicator 154 to slide easily thereover when the indicator is moved in one direction. When the indicator is raised, as by moving the float 142 upwardly, it cannot move until the button 190 on the upper end of the release rod 192 is depressed. This depressing of the release rod compresses spring 194 that reacts on the button 190 and the rail 162. At the same time, all of the stops 196 that are carried by release rod 192 are moved downwardly thereby pivotally actuating the pawls 183 and moving them from the path of movement of indicator 154. In this way, the float 142 together with its rod 146 and indicator 154 is capable of being elevated. As in the previously described release rods, rod 192 is captive in a guideway 198 that is formed in rail 162 for this purpose.

The operation of this embodiment of the invention is very similar to the operation of the previously described embodiment. Float 140 is used to indicate the most full condition of the tank 120 by being elevated. The upward movement of the float 140 is permissible in that the indicator 152 rides by the pawls 166 in the up direction of movement. However, the indicator 152 cannot return since the pawls 166 prevent this. Therefore, when the supply in tank 120 is increased, the most full condition of the tank is indicated by the retention of indicator 152 in the high position.

The low condition of the tank is registered by the indicator 154. As the liquid is depleted from tank 120 float 142 follows the level downwardly inasmuch as indicator 154 is capable of moving downwardly past the pawls 183. But at the lowermost condition, that is, the oil or other liquid level at the time that additional liquid is put into the tank 120, an indicator is held inasmuch as the float 142 cannot move upwardly with the liquid level. This is the case inasmuch as the pawls 183 act as a stop for the upward movement of the indicator 154. As in the previously described embodiment, upon manipulation of the release rod 192, the pawls 183 are separated from engagement with the indicator 154 whereby this indicator may be used to show the various liquid level conditions in the tank during the use of the liquid therein.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. In a device to measure both high and low levels of the liquid contents of a tank, a first float, means connected with said first float for holding said first float in its highest position to indicate the highest level of liquid in said tank, manually operable means for releasing said first float holding means in order to permit said first float to lower, a second float, means operatively connected with said second float for holding said second float in the lowermost position of its flotation caused travel, releasing means operatively connected with said second float holding means to permit said second float to be elevated to the level of liquid in the tank, a rod secured to each float and movable therewith, an indicator on each of said rods, a plate having indicia thereon located adjacent to said indicators, and mounting means adapted to be operatively connected with the tank and having apertures therein through which said rods are passed.

2. The construction of claim 1 wherein said floats have means operatively connected therewith for the prevention of rotation of said floats.

3. The combination of claim 1 wherein said plate has tubes protruding therefrom and adapted to be located in the tank, said floats being slidable in said tubes, said tubes being perforated so that the floats in said tubes are subjected to the liquid in the tank and movable therewith as the liquid level rises and lowers.

References Cited in the file of this patent

UNITED STATES PATENTS

| 1,407,388 | Dedet | Feb. 21, 1922 |
| 1,546,409 | Schmidt | July 21, 1925 |
| 1,581,440 | Hammerstrom | Apr. 20, 1926 |
| 1,647,806 | McLain | Nov. 1, 1927 |
| 1,734,430 | Hartcup | Nov. 5, 1929 |

FOREIGN PATENTS

| 10,885 | Great Britain | July 12, 1890 |
| 115,472 | Germany | Dec. 18, 1900 |